United States Patent
Ho

(10) Patent No.: US 10,043,246 B2
(45) Date of Patent: Aug. 7, 2018

(54) IMAGE PROCESSING APPARATUS

(71) Applicant: Novatek Microelectronics Corp., Hsinchu (TW)

(72) Inventor: Hsiu-Wei Ho, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 145 days.

(21) Appl. No.: 15/137,005

(22) Filed: Apr. 25, 2016

(65) Prior Publication Data

US 2017/0236254 A1    Aug. 17, 2017

(30) Foreign Application Priority Data

Feb. 15, 2016 (TW) .............................. 105104368 A

(51) Int. Cl.
G06T 5/00 (2006.01)
(52) U.S. Cl.
CPC .............. G06T 5/003 (2013.01); G06T 5/002 (2013.01); G06T 5/007 (2013.01); G06T 2207/10024 (2013.01); G06T 2207/20024 (2013.01); G06T 2207/20182 (2013.01); G06T 2207/20208 (2013.01)
(58) Field of Classification Search
CPC .......... G06T 5/007; G06T 5/002; G06T 5/003
See application file for complete search history.

(56) References Cited

U.S. PATENT DOCUMENTS

| | | | | |
|---|---|---|---|---|
| 8,340,461 | B2 * | 12/2012 | Sun | G06K 9/40 358/3.26 |
| 9,418,402 | B2 * | 8/2016 | Hong | G06K 9/4661 |
| 9,508,129 | B1 * | 11/2016 | Wang | G06T 5/007 |
| 9,646,364 | B1 * | 5/2017 | Wang | G06T 5/00 |
| 9,754,356 | B2 * | 9/2017 | Li | G06T 5/00 |

(Continued)

FOREIGN PATENT DOCUMENTS

| | | |
|---|---|---|
| CN | 102411774 | 4/2012 |
| CN | 102968772 | 3/2013 |
| CN | 103198459 | 7/2013 |

OTHER PUBLICATIONS

He et al. "Single Image Haze Removal Using Dark Channel Prior" IEEE Transactions on Pattern Analysis and Machine Intelligence, vol. 33, No. 12, Dec. 2011.*

(Continued)

*Primary Examiner* — Mia M Thomas
(74) *Attorney, Agent, or Firm* — JCIPRNET

(57) ABSTRACT

An image processing apparatus including an image transmission map estimator, a transmission map optimizer, and an image rebuilder is provided. The image transmission map estimator receives an input image and estimates transmission rate of the input image to generate an estimated transmission map. The transmission map optimizer receives the estimated transmission map and operates smooth operations with different strength on the estimated transmission map to respectively generate a plurality of smoothed transmission maps. The transmission map optimizer generates an optimized transmission map according to the estimated and smoothed transmission maps. The image rebuilder receives the optimized transmission map and generates an output image by rebuilding the input image according to the optimized transmission map.

13 Claims, 2 Drawing Sheets

(56) References Cited

U.S. PATENT DOCUMENTS

| | | | | |
|---|---|---|---|---|
| 2011/0188775 A1* | 8/2011 | Sun | ............................ | G06K 9/40 |
| | | | | 382/274 |
| 2014/0254931 A1* | 9/2014 | Lai | ............................ | G06T 5/003 |
| | | | | 382/167 |
| 2015/0071563 A1* | 3/2015 | Park | ............................ | G06T 5/007 |
| | | | | 382/274 |
| 2015/0287170 A1* | 10/2015 | Hong | ............................ | G06T 5/002 |
| | | | | 382/274 |
| 2016/0005152 A1* | 1/2016 | Yang | ............................ | G06K 9/40 |
| | | | | 382/275 |
| 2016/0071244 A1* | 3/2016 | Huang | ............................ | G06T 5/002 |
| | | | | 382/263 |
| 2016/0292824 A1* | 10/2016 | Li | ............................ | G06T 5/002 |
| 2016/0366352 A1* | 12/2016 | Kobayashi | ............................ | G06T 5/40 |
| 2017/0132761 A1* | 5/2017 | Wang | ............................ | G06T 5/00 |
| 2017/0132771 A1* | 5/2017 | Agaian | ............................ | G06T 5/40 |
| 2017/0178297 A1* | 6/2017 | Fattal | ............................ | G06T 5/003 |
| 2017/0236254 A1* | 8/2017 | Ho | ............................ | G06T 5/002 |
| | | | | 382/275 |
| 2017/0316551 A1* | 11/2017 | Hong | ............................ | G06T 5/003 |

OTHER PUBLICATIONS

Schechner et al. "Instant Dehazing of Images Using Polarization" Proc. Computer Vision & Pattern Recognition vol. 1, pp. 325-332 (2001).*

Van Herk et al. "A fast algorithm for local minimum and maximum filters on rectangular and octagonal kernels" Journal Pattern Recognition Letters archive vol. 13 Issue 7, Jul. 1992 pp. 517-521.*

"Office Action of Taiwan Counterpart Application", dated Aug. 25, 2016, p. 1-p. 7.

* cited by examiner

IMAGE PROCESSING APPARATUS

CROSS-REFERENCE TO RELATED APPLICATION

This application claims the priority benefit of Taiwan application serial no. 105104368, filed on Feb. 15, 2016. The entirety of the above-mentioned patent application is hereby incorporated by reference herein and made a part of this specification.

BACKGROUND OF THE INVENTION

Field of the Invention

The invention generally relates to an image processing apparatus, and particularly, to an image processing apparatus for compensating an image transmission rate.

Description of Related Art

Along with the evolution of the electronic technology, for the convenience of capture and transmission of information, high performance image capture device has been essential component of an electronic device.

During an image capture process, image is usually transmitted to an image capture device via air. During such transmission, the quality of the image transmitted to the image capture device may be varied due to an image transmission rate of the air at the time which the image was transmitted. Especially, in outdoor environment, the air may contain smog or haze, which would blur the captured image and causes problems such as deterioration in quality, poor contrast, color distortion, etc.

Conventionally, an estimation of a transmission map is performed to an input image, and compensation to such effect is performed according to the transmission map. Herein, the transmission map includes a plurality of values, where each of the values corresponds to each pixel in the input image and represents a distortion status of the corresponding pixel resulted from the transmission of the image to the image capturing device. However, the estimations of the transmission map are often erroneous due to the color of the object in the image and brightness of the image. For example, the transmission map of an object having color similar to the color of atmosphere are under estimated. The estimation of the transmission rate of the low brightness object would come out to be higher (the estimation of the transmission rate of the high brightness object would come out to be lower), which results in a contradiction where different transmission rates may be estimated for the same object. Therefore, the effect of the conventional de-haze process is unsatisfactory.

SUMMARY OF THE INVENTION

Accordingly, the disclosure provides an electronic apparatus and a method for detecting the key status of the electronic apparatus. In the disclosure, a conversion circuit having calibration mechanism of the electronic apparatus, which is responsible for other system functions (such as temperature control function or power monitor function, etc.), may be utilized to assist scan operation of the key status of the electronic apparatus. As a result, in addition to the benefit of accurately determine the press status of the keys, the circuit resource of the electronic apparatus is maximized.

The disclosure provides an image processing apparatus, which is utilized for improving hazing effect on the image due to the transmission.

In the disclosure, the image processing apparatus includes an image transmission map estimator, a transmission map optimizer, and an image rebuilder. The image transmission map estimator receives an input image and performs an estimation to the input image to obtain an estimated transmission map. The transmission map optimizer is coupled to the image transmission map estimator. The transmission map optimizer receives the estimated transmission map and performs a plurality of smoothing operations with different strengths to the estimated transmission map to respectively generate a plurality of smoothed transmission maps. The transmission map optimizer then generates an optimized transmission map according to the estimated transmission map and the smoothed transmission maps. The image rebuilder is coupled to the transmission map optimizer. The image rebuilder receives the optimized transmission map and rebuilds the input image according to the optimized transmission map to generate an input image.

In one of the exemplary embodiments of the disclosure, the image processing apparatus further includes a de-hazing strength generator. The de-hazing strength generator is coupled to the transmission map optimizer and the image rebuilder. The de-hazing strength generator generates a de-hazing strength value according to the optimized transmission map and provides the de-hazing strength value to the image rebuilder. The image rebuilder generates the output image according to the de-hazing strength value.

Based on the above, the disclosure performs optimization operation to the estimated transmission map of the input image and rebuilds the image according to the optimized transmission map, so as to enhance the effect of image display. In addition, one of the exemplary embodiments of the disclosure provides a de-hazing strength generator for dynamically providing de-hazing strength values according to the hazy status of the input image. Accordingly, the image processing apparatus may perform de-hazing operation to further enhance the quality of the output image.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
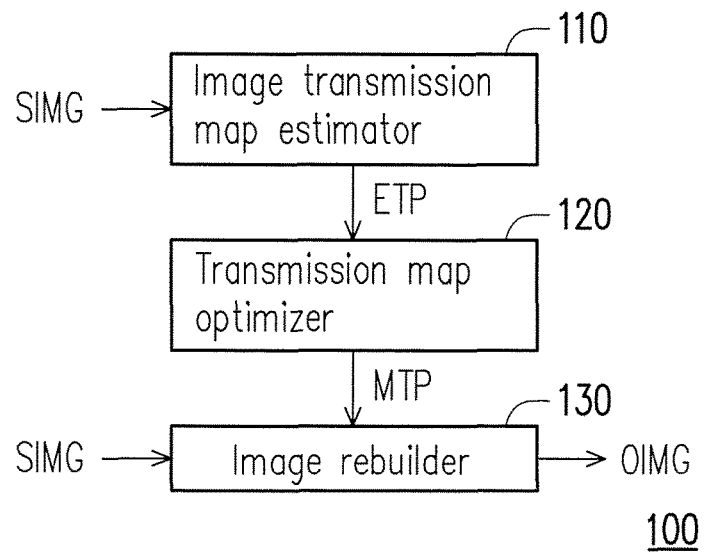
FIG. 1 is a diagram illustrating an image processing apparatus according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

With reference to FIG. 1, FIG. 1 is a diagram illustrating an image processing apparatus according to an exemplary embodiment of the present disclosure. The image processing apparatus 100 includes an image transmission map estimator 110, a transmission map optimizer 120, and an image rebuilder 130. First of all, the image processing apparatus 100 of the embodiment of the disclosure performs the image processing according to an image model represented by equation (1) shown below:

$$I(x)=J(x)t(x)+A(1-t(x)) \tag{1}$$

Where, I represents an hazy image (i.e., an input image SIMG) obtained by an image capturing device, x represents each pixel in the image, J represents a de-hazed image, t represents a medium transmission rate, A represents atmospheric light information that affects to the image transmission.

In the following, details regarding the image processing apparatus 100 of the exemplary embodiment of the disclosure are described. The image transmission map estimator 110 receives the input image SIMG and estimates a transmission rate for the input image SIMG to obtain a transmission map ETP. The transmission map optimizer 120 is coupled to the image transmission map estimator 110. The transmission map optimizer 120 receives the estimated transmission map ETP, and performs smooth operations with different strengths to the estimated transmission map ETP as to respectively generate a plurality of smoothed transmission maps. In addition, the transmission map optimizer 120 may generate an optimized transmission map MTP according to the estimated transmission map and smoothed transmission maps. The image rebuilder 130 is coupled to the transmission map optimizer 120. The image rebuilder 130 receives the optimized transmission map MTP and rebuilds the input image SIMG according to the optimized transmission map MTP to generate an output image OIMG.

In the exemplary embodiment, the image transmission map estimator 110 may utilize the principle of dark channel prior for estimating the transmission rate of each pixel in the input image SIMG. Where, the estimated transmission map EPT may be represented by equation (2) shown below:

$$ETP(x) = 1 = \varpi \min_{C \in [r,g,b]} \left( \frac{I^C(x)}{A^C} \right) \tag{2}$$

Where, w represents a de-haze strength value, A is configured to be an average value of 0.1% of the pixels having highest brightness in the input image SIMG, r, g, b respectively represents red, green and blue colors.

It should be noted that, the calculation of the estimated transmission map ETP illustrated in the equation (2) only calculates the lowest value of the red, green, and blue channels for each pixel in the input image SIMG, and does not calculate the lowest value of the neighboring pixels.

The estimation of the transmission map described above is a non-limiting exemplary embodiment. In fact, one of ordinary skill in art would understand that other method for estimating the transmission map (e.g., semi-inverse image) or color attenuation prior may be applied to the exemplary image transmission map estimator 110.

Figure 2:
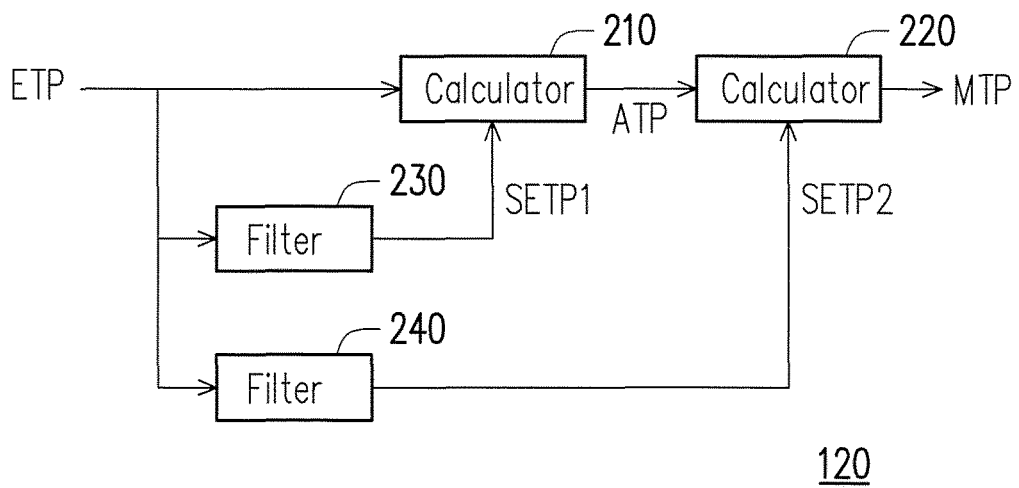
FIG. 2 is a diagram illustrating an implementation of the transmission map optimizer according to an exemplary embodiment of the disclosure.

In the following. details regarding the transmission optimizer 120 are described with reference to FIGS. 1 and 2. FIG. 2 is a diagram illustrating an implementation of the transmission map optimizer according to an exemplary embodiment of the disclosure. The transmission map optimizer 120 includes calculators 210, 220 and filters 230, 230. The filters 230, 240 receive the estimated transmission map ETP generated by the image transmission map estimator 110. The filters 230, 240 perform the smooth operations with different strengths to the estimated transmission map ETP, so as to respectively generate smoothed transmission maps SETP1, SETP2. In detail, the filters 230, 240 may be configured respectively to have different size of envelops, and perform smooth operations according to those envelops having different sizes. It should be noted that, in one of the embodiments, the envelop size of the filter 230 is smaller than the envelop size of the filter 240. As a result, for the smooth operations performed to the transmission map ETP, the effect of the smooth operation performed by the filter 230 is lower than the effect of the smooth operation performed by the filter 240.

In the exemplary embodiment, the calculator 210 is coupled to the filter 230 and receives the estimated transmission map ETP and the smoothed transmission map SETP1. The calculator 210 may perform an interpolation to the estimated transmission map ETP and the smoothed transmission map SETP1 according to a weighting matrix, and accordingly generates a calculated transmission map ATP. Wherein, the computation of the calculated transmission map ATP may be represented by equation (3) as shown below:

$$ATP(x)=W_{weak}(x) \times SETP1(x)+(1-W_{weak}(x)) \times ETP(x) \tag{3}$$

Wherein, $W_{weak}$ is the weighting matrix, and $W_{weak}(x)$ is weight value corresponding to pixel x in the weighting matrix.

The weighting matrix $W_{weak}$ may be generated by performing a computation using a function according to a difference between the estimated transmission map ETP and the smoothed transmission map SETP 1, where the mathematical correlation may be represented as equation (4) shown as follows:

$$W_{weak}(x)=f(ETP(x)-SETP1(x)) \tag{4}$$

Wherein, f( ) represents the aforementioned function which may be Gaussian or linear gamma function. It should be noted that the weight value $W_{weak}(x)$ is inversely proportional to the difference between the estimated transmission map ETP and the smoothed transmission map SETP1.

Furthermore, the calculator 220 is coupled to the calculator 210 and the filter 240. The calculator 220 receives the smoothed transmission map SETP2 and the calculated transmission map ATP and performs an interpolation to the smoothed transmission map SETP2 and the calculated transmission map ATP according to another weighting matrix, so as to generate an optimized transmission map MTP. Wherein, the computation of the calculated transmission map MTP may be represented by equation (5) shown below:

$$MTP(x)=W_{strong}(x) \times SETP2(x)+(1-W_{strong}(x)) \times ATP(x) \tag{5}$$

Here, the weighting matrix $W_{strong}$ may be generated by performing computation using a function according to the calculated transmission map ATP, where the mathematical correlation may be represented by equation (6) shown below:

$$W_{strong}(x)=g(ATP(x)) \tag{6}$$

Wherein, g( ) represents the function, and the function may be Gaussian or linear gamma function. It should be noted that the weight value $W_{strong}(x)$ is inversely proportional to the calculated transmission map ATP.

Next, the image rebuilder 130 receives the optimized transmission map MTP generated by the transmission map optimizer 120, and accordingly performs image rebuilding operation. Wherein, equation for rebuilding the image to obtain a de-hazed image J may be represented by equation (7) shown as follows:

$$J(x) = \frac{SIMG(x) - A}{\max(MTP(x), tlb)} + A \tag{7}$$

Wherein, max(MTP(x), tlb) represents maximum value between the MTP(x) and tlb, and tlb is a predetermined lower limit of the transmission rate which is utilized to maintain de-hazing function in the hazy region, so as to avoid noise or defects.

It may be understood based on the above description that the image rebuilder 130 may calculate the output image OIMG according the equation (7). In other words, the output image OIMG (i.e., de-hazed image J) may be calculated according to the input image SIMG, atmospheric light information A and a plurality of maximum values calculated by utilizing the optimized transmission map MTP and the lower limit of the transmission rate tlb.

Figure 3:
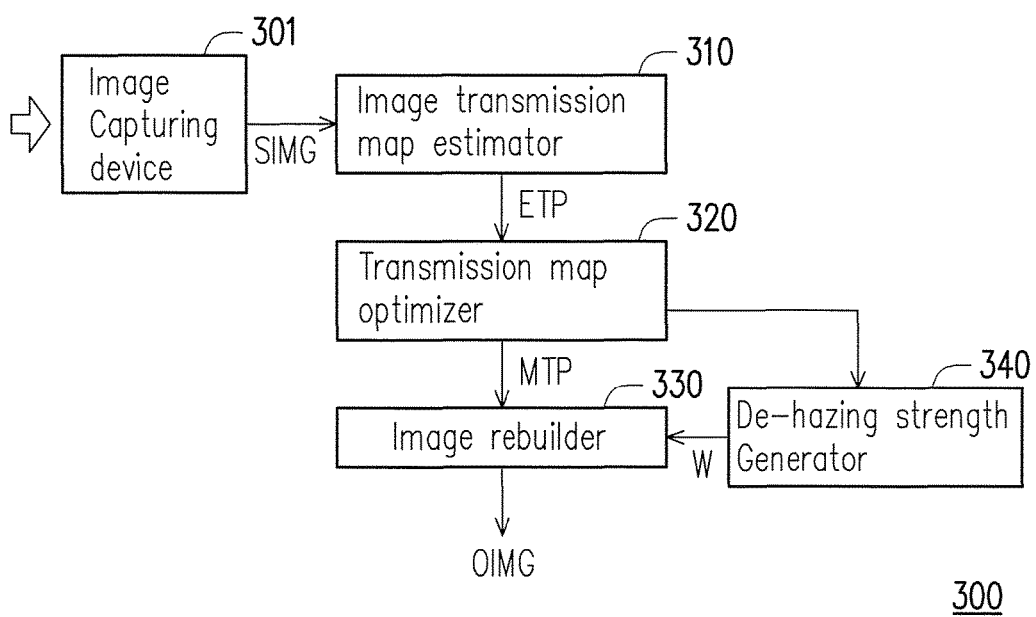
FIG. 3 is a diagram illustrating an image processing apparatus according to another exemplary embodiment of the disclosure.

With reference to FIG. 3, FIG. 3 is a diagram illustrating an image processing apparatus according to another exemplary embodiment of the disclosure. The image processing apparatus 300 includes an image capturing device 301, an image transmission map estimator 310, a transmission optimizer 320, an image rebuilder 330, and a de-hazing strength generator 340. The image capturing device 310 is utilized to capture image and transmits information of the captured image to the transmission map estimator 310 as an input image SIMG. The image transmission map estimator 310 estimates transmission rate of the pixels of the input image SIMG and obtains an estimated transmission map ETP. The estimated transmission map ETP may be transmitted to the transmission map optimizer 320. The transmission map optimizer 320 may perform optimization operation to the estimated transmission map ETP and generate an optimized transmission map MTP. The detailed operations of the image transmission map estimator 310 and the transmission map optimizer 320 are similar to the transmission map estimator 110 and the transmission map optimizer 120 of the aforementioned exemplary embodiment, and thus the detail descriptions of which are not being repeated here.

As compared to the exemplary embodiment illustrated in FIG. 1, the present exemplary embodiment further includes the de-hazing strength generator 340. The de-hazing strength generator 340 is coupled to the image rebuilder 330 and the transmission map optimizer 320. The de-hazing strength generator 340 may configure a region size. Then, a plurality of dynamic range widths of a plurality of partial regions within the input image SIMG may be calculated. Wherein, the size of each of the partial regions may equal to the region size configured by the de-hazing generator 340. The dynamic range width refers to a variation range of pixel brightness in each region. In the exemplary embodiment, the dynamic range widths may be represented by R(x)=M(x)−m(x), where M(x)=max{L(y)|y∈Ω(x)}, m(x)=min{L(y)|y∈Ω(x)}, and Ω(x) represents a plurality of pixels of the neighboring regions around a center at a pixel x, i.e., the plurality of pixels in the regions. L(y) represents the brightness of a pixel y.

The de-hazing strength generator 340 calculates an average dynamic range width for the plurality of dynamic range widths, where the average range width $R_{AVG}$ may be calculated by equation (8) shown as follows:

$$R_{AVG} = \sum_{x, SETP2(x) < \bar{t}} R(x)/N \tag{8}$$

Wherein, N is the number of values in the smoothed transmission map SETP2 that are smaller than $\bar{t}$, and $\bar{t}$ may be calculated through equation (9) shown as follows:

$$\bar{t} = \sum_x SETP2(x)/WH \tag{9}$$

Wherein, W and H are length and width of the input image SIMG, respectively.

Next, the de-hazing strength generator 340 performs de-hazing operation to the input image SIMG according to a plurality of predetermined de-hazing strengths, so as to generate a plurality of de-hazed images. The de-hazing strength generator 340 may calculate the average dynamic width of each de-hazed images, and then calculate a mist density D, where the mist density D may be calculated by equation (10) shown as follows:

$$D = \max\left\{\frac{R_\theta - R_{AVG}}{R_{AVG}} \,\middle|\, \theta \in \{0.1, 0.2, 0.3\ldots, 1\}\right\} \tag{10}$$

Wherein, $R_\theta$ is an average dynamic range width of the pre de-hazed images generated by performing the de-hazing operations according to the predetermined de-hazing strengths θ. In the equation (10), an increase of the mist density D represents that the mist is dense. In the equation, value of the predetermined de-hazing strengths θ may be between 0 to 1, and the predetermined de-hazing strengths θ may be arbitrarily set. The number of predetermined de-hazing strengths θ may be arbitrarily set. The exemplary embodiment is not intended to limit the disclosure.

The de-hazing generator 340 performs mapping to the mist density D through a mapping function, so as to generate the de-hazing strength. The de-having strength ω may be calculated by equation (11) shown below:

$$\bar{\omega} = h(\max(0, \min(D-b, 1))) \tag{11}$$

Wherein, h is a mapping function, b is a predetermined de-hazed threshold, where the mist density D is positively proportional to the de-hazing strength ω.

In addition, the mapping function h may be a linear mapping function or non-linear mapping function, the exemplary embodiment is not intended to limit mapping function of the disclosure. The point is that the mapping function h may generate the de-hazing strength ω, which is appropriate for the image rebuilder 330 to process values, according to the mist density D. For example, the image rebuilder 330 may reconstruct the output image OIMG that is clear.

It should be noted that the de-having strength ω of the exemplary embodiment may be calculated and dynamically adjusted according to different status of the input image. As a result, the image processing apparatus 300 may consider environmental factors and generate a clear output image OIMG, so as to enhance the image quality.

On the other hand, the image capturing device 301, the image transmission map estimator 310, the transmission map optimizer 320, the image rebuilder 330 and the de-hazing strength generator 340 of the exemplary embodiment may be constructed by utilizing circuits having specific functions, such as digital circuits. The digital circuits may be implemented through, but not limited to, conventional digital circuit design (e.g., high level hardware descriptive language and synthesizer), Application-Specific Integrated Circuit (ASIC), or Field Programmable Gate Array (FPGA).

Furthermore, the image capturing device 301, the image transmission map estimator 310, the transmission map optimizer 320, the image rebuilder 330 and the de-hazing strength generator 340 may also be constructed by utilizing one or more controllers or processors having computation ability.

In addition to the embodiments of circuits, the correlation of the parameters or variables of the equations (1) thru (11) may be implemented by establishing look up tables.

Based on the above, the disclosure provides optimization of the transmission map, which optimizes the estimated transmission map, so as to generate clear output image. In addition, the disclosure provides a de-hazing strength generator that dynamically adjust the de-hazing strength. As a result, the de-hazing operation may be more adaptive (or effective) by considering the environmental variations which the image processing apparatus is in.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image processing apparatus, comprising:
an image transmission map estimator, configured to receive an input image and estimate a transmission rate of each of the pixels of the input image to obtain an estimated transmission map corresponding to the pixels of the input image;
a transmission map optimizer, configured to receive the estimated transmission map, perform a plurality of smoothing operations with different strengths to the estimated transmission map to respectively generate a plurality of smoothed transmission maps, and generate an optimized transmission map according to the estimated transmission map and the smoothed transmission maps; and
an image rebuilder, configured to receive the optimized transmission map, and rebuild the input image according to the optimized transmission map to generate an output image.

2. The image processing apparatus as claimed in claim 1, wherein the transmission map optimizer comprising:
a first filter, performing a first filtering operation to the estimated transmission map through a first envelop, and generating a first smoothed transmission map; and
a second filter, performing a second filtering operation to the estimated transmission map through a second envelop, and generating a second smoothed transmission map,
wherein a size of the first envelop is smaller than a size of the second envelop.

3. The image processing apparatus as claimed in claim 2, wherein the transmission map optimizer further comprises:
a first calculator, coupled to the first filter, receiving the estimated transmission map and the first smoothed transmission map, performing an interpolation to the estimated transmission map and the first smoothed transmission map according to a first weighting matrix to generate a first calculated transmission map; and
a second calculator, coupled to the second filter and the first calculator, receiving the second smoothed transmission map and the calculated transmission map, performing an interpolation to the second smoothed transmission map and the calculated transmission map according to a second weighting matrix to generate the optimized transmission map.

4. The image processing apparatus as claimed in claim 3, wherein the transmission map optimizer executes a calculation by using a function according to a difference of the estimated transmission map and the first smoothed transmission map to generate the first weighting matrix.

5. The image processing apparatus as claimed in claim 4, wherein the first weighting matrix is inversely proportional to the difference of the estimated transmission map and the first smoothed transmission map.

6. The image processing apparatus as claimed in claim 3, wherein the transmission map optimizer executes a calculation by using a function according to the calculated transmission map to generate the second weighting matrix.

7. The image processing apparatus as claimed in claim 6, wherein the second weighting matrix is inversely proportional to the calculated transmission map.

8. The image processing apparatus as claimed in claim 1, wherein the image rebuilder calculates a plurality of maximum values of the optimized transmission map and a transmission rate lower limit, and calculates the output image according to the input image, atmospheric light information and the maximum values.

9. The image processing apparatus as claimed in claim 1, further comprising:
a de-hazing strength generator, coupled to the transmission map optimizer and the image rebuilder, generating a de-hazing strength value according to the optimized transmission map, and providing the de-hazing strength value to the image rebuilder,
wherein the image rebuilder generates the output image according to the de-hazing strength value.

10. The image processing apparatus as claimed in claim 9, wherein the de-hazing strength generator calculates a plurality of dynamic range widths of a plurality of partial regions in the input image, calculates an average dynamic range width according to the plurality of dynamic range widths, and calculates a mist density of the input image according to the average dynamic range width, wherein the de-hazing generator generates the de-hazing strength value according to the mist density.

11. The image processing apparatus as claimed in claim 10, wherein the de-hazing strength generator performs a pre de-hazing operation to the input image according to a plurality of predetermined de-hazing strengths and respectively generates a plurality of pre de-hazed images, wherein the de-hazing strength generator respectively calculates a plurality of pre de-hazing average dynamic range widths of the pre de-hazed images, and calculates the mist density according to a different value between each of the pre de-hazing average dynamic range widths and the average dynamic range width.

12. The image processing apparatus as claimed in claim 10, wherein the de-hazing strength generator calculates a plurality of different values of each of the pre de-hazing average dynamic range widths and average dynamic range width, and the de-hazing strength generator calculates a difference of each of the different values and the average dynamic range width to obtain a plurality of values, and obtains the maximum value among the values to generate the mist density.

13. The image processing apparatus as claimed in claim 9, wherein the mist density is positively proportional to the de-hazing strength.

* * * * *